Aug. 22, 1967  C. J. DAVIS  3,336,697
FLOWER HOLDER
Original Filed Oct. 22, 1963  2 Sheets-Sheet 1
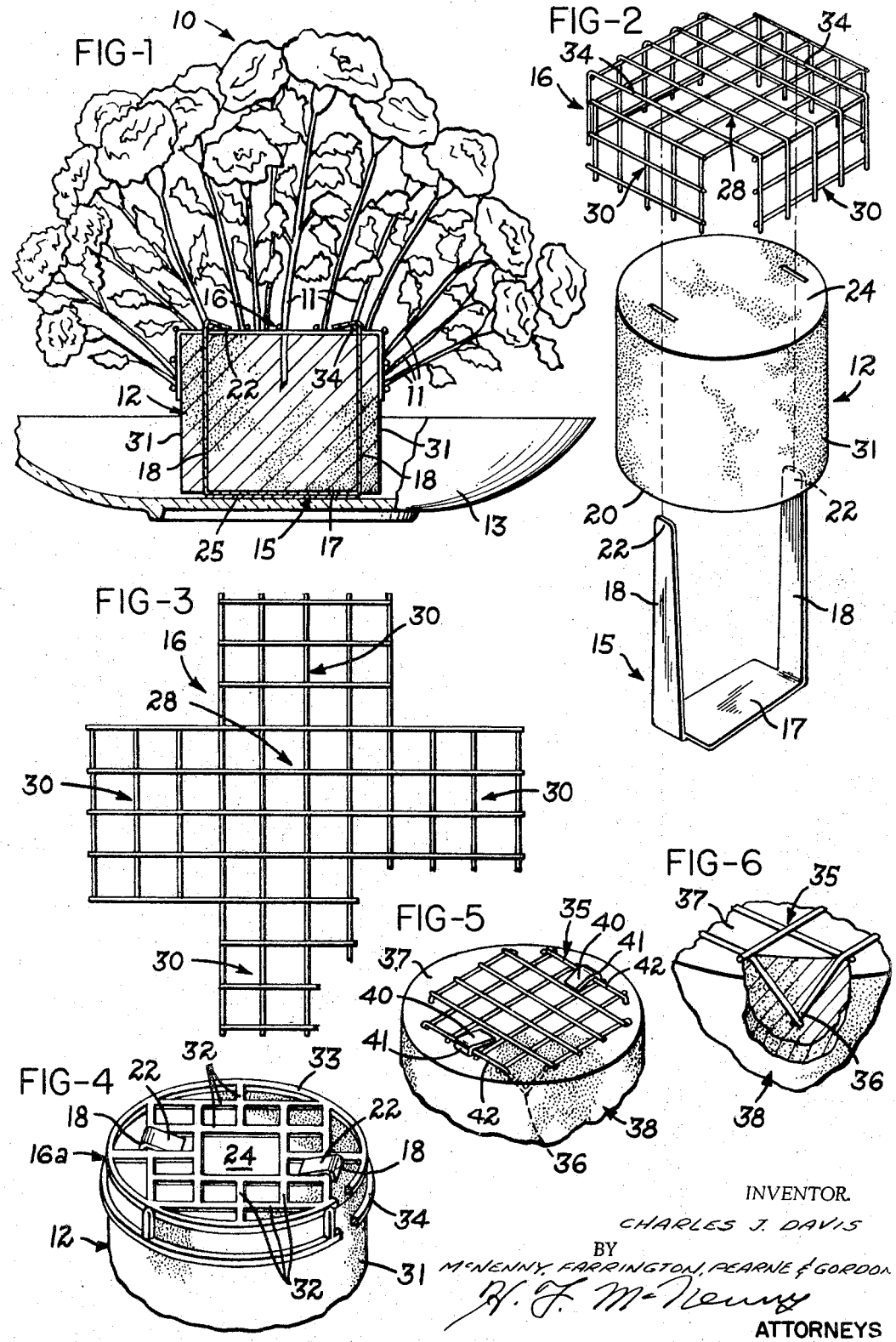
INVENTOR.
CHARLES J. DAVIS
BY
MCNENNY, FARRINGTON, PEARNE & GORDON
ATTORNEYS

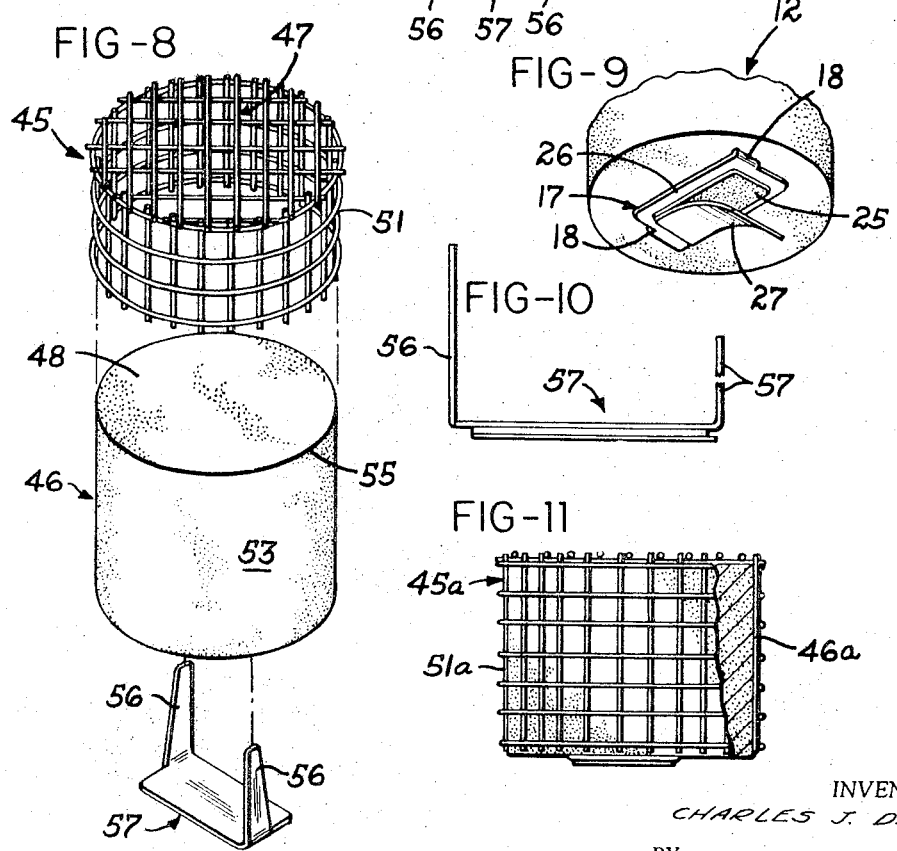

United States Patent Office 3,336,697
Patented Aug. 22, 1967

3,336,697
FLOWER HOLDER
Charles J. Davis, Kettering, Ohio, assignor to Daco Products, Inc., Kent, Ohio, a corporation of Ohio
Continuation of application Ser. No. 317,994, Oct. 22, 1963. This application July 8, 1965, Ser. No. 470,398
7 Claims. (Cl. 47—41.12)

This application is a continuation of my copending application Ser. No. 317,994 filed Oct. 22, 1963 and now abandoned.

This invention relates to apparatus for use in creating flower displays, and particularly to apparatus for supporting the stems of flowers.

In recent years, florists have extensively used various semi-rigid foams for anchoring the stems of flowers in place to form a floral display. These foams are rigid enough to support the flowers but soft enough to allow the stems to penetrate the material, and further they are highly absorbent so that the stems of the flowers are easily supplied with moisture for maximum periods of time. The preferred types of these materials are semi-rigid crushable polyurethane or phenol formaldehyde foams, or other foamed synthetic resin material, such as that disclosed in U.S. Patent No. 2,753,277, issued July 3, 1956. A widely known foam is sold under the trade name "Oasis."

These foam materials are not without disadvantages however, and one of the more serious problems is the mounting of the foam block in conventional vases and dishes. The foam material is very light and consequently will not by itself support a tall flower display. It is presently necessary to use a specially designed dish or vase which have an integral retainer into which the foam block is inserted. Such dishes limit the configuration of the block which can be used thereby, and consequently the type of floral display which can be assembled therein. Even when some other form of anchor is used to hold the foam block in the dish, it is difficult to transport or handle the assembled floral display because of the ineffectiveness of these anchors to securely hold the foam block in place.

Another serious disadvantage of the foam material is the result of the breaking up which occurs when a large number of holes are punched in a block of the material. This occurs when the many stems of a very dense floral arrangement are placed in the block of foam, and consequently results in a less rigid display and weakens the block.

Accordingly, it is an important object of this invention to provide a novel apparatus for securely mounting a floral display in a conventional tray, dishes, special containers, or the like which is inexpensive to manufacture, and simple to use.

Another object of this invention is to provide an improved device for holding the stems of flowers in a display and increasing the strength and useful life of the semi-rigid foam materials, and particularly to provide a floral anchor device for securing a block of semi-rigid foam to substantially any surface, which can be adapted to any size or shape of foam blocks, and which is not subject to failure as a result of being submerged in water.

A further object of the invention is to provide floral display apparatus of the aforesaid type which is simple in design for maximum usefulness and minimum cost, and further to provide a foam block securing device which can be submerged below the surface of water in a vase or dish without significantly decreasing its ability to hold the foam block in position.

Additional objects and advantages of the invention will be apparent from the following description, the accompanying drawings and the appended claims.

In the drawings—

FIGURE 1 is an elevational view, partially broken away, illustrating one embodiment of the invention;

FIGURE 2 is an exploded perspective view of the invention;

FIGURE 3 is a plan view of the wire mesh retainer;

FIGURE 4 is a perspective view of another embodiment of the reinforcing member shown mounted on the foam block;

FIGURE 5 is a perspective view similar to FIGURE 4 showing another embodiment of the retainer;

FIGURE 6 is an enlarged perspective view partially broken away of the retainer shown in FIGURE 5;

FIGURE 7 illustrates a side view of an embodiment of the invention;

FIGURE 8 is an exploded perspective view of the FIGURE 7 embodiment of the invention;

FIGURE 9 is a fragmentary perspective view of the anchor device in a foam block;

FIGURE 10 is a side view of the anchor device; and

FIGURE 11 is a side view of another embodiment of the invention.

Referring to the drawings, wherein preferred embodiments are shown, FIGURE 1 illustrates a plurality of flowers 10 having their stems 11 supported in a semi-rigid foam block 12. The foam block is cylindrical in configuration and is secured in the conventional vase or dish 13 against relative movement in any direction by retainer or anchor 15, and the upper portion of the foam block is reinforced by the reinforcing wire member 16.

The anchor 15 is constructed of relatively thin sheet metal and includes a rectangular main portion 17 having an upwardly bent prong 18 integrally formed on each of the narrow ends of the main portion 17, as shown in FIGURE 2. The prongs 18 are rigid enough that they can be forced upwardly into the foam block 12 for securing the main portion 17 to the bottom surface 20 thereto (FIGURE 9). The length of the prongs 18 is dependent on the thickness of the block, and is sufficiently long to permit the tips 22 thereof to extend a short distance above the top surface 24 of the block 15.

The use of two prongs 18, as opposed to one, is preferred since together they effectively resist forces which tend to twist or tip the block 15 when the anchor 15 is secured to a flat surface, e.g., in a vase. Moreover, the use of a pair of prongs lends simplicity to the manufacturing operation, but it is within the scope of this invention to use any number thereof which meets the functional requirements set forth herein.

An adhesive strip 25 is applied to the lower surface 26 of the main portion 17, as shown in FIGURES 1 and 9, for the purpose of securing the anchor 15 and block 12 to the bottom surface of the dish. The strip 25 is adhesive on both sides thereof, and is preferably applied to the anchor prior to shipment and the exposed side is covered by a strip of protective paper 27 which can be easily removed in the conventional manner immediately prior to use. The adhesive strip 25 is preferably constructed of a water-resistant material which will not lose its bonding effectiveness when submerged in water for a substantial period of time. For example, a fiber impregnated rubber sealing tape sold by DAP, Inc. of Dayton, Ohio may be used.

The reinforcing wire member 16 is cross-shaped, as seen in FIGURE 3, with a central portion 28 which engages the top surface 24 of the block 12, and the side portions 30 which are bent perpendicularly to the central portion 28 so that they snugly engage the side walls 31 of the block 12. The mesh of the wire member 16 is large enough to permit flower stems of various diameters to be easily inserted therethrough into the block 12 and being sufficiently closely spaced to prevent the stems from any substantial movement in the block when subjected to rough handling and the like.

The distance between the side portions 30 is such that it requires some force to slide the member onto the block 12 thus holding the member 16 thereon against relative movement. When flower stems are inserted into the block 12, the member prevents the edge and side portions thereof from breaking or chipping off, thus increasing the useful life thereof and insuring that floral displays created thereon will withstand rough treatment during handling and transportation.

While the block 12 and associated wire member 16 are shown and described as being cylindrical in configuration, it is within the scope of the invention to use substantially any configuration thereof so long as the wire member is complementary in shape to and reinforces the block 12. Thus the block can be elongated, or a cube, or a frusto cone.

The wire member 16 is held in place on the top surface 24 of the block 12 by the tips 22 of the prongs 18 which are deformed over the wires 34 of the member 16, as shown in FIGURE 1. Thus the member 16, the block 12, and the anchor 15 are secured together in such a manner that they cannot be easily separated by normal rough handling thereof, and even when the entire floral display is inverted.

Another embodiment of the reinforcing member 16a is shown in FIGURE 4, and it includes a molded plastic material with the cross ribs 32 which are integrally connected to the upper ring 33 which engage the upper peripheral portion of the block 12. The lower ring 34 surrounds the side wall 31 of the block to hold the member 16a snugly thereon. The tip 22 of the prongs 18 are bent over two of the ribs 32 to hold the member 16a, the retainer 17, and the block 12 together.

Another embodiment of the invention is shown in FIGURES 5 and 6 wherein the wire member 35 consists of a square piece of wire mesh with the corners 36 thereof bent perpendicularly to the plane of the remainder of the member. The wire member 35 is secured to the top surface 37 of the foam block 38 by forcing these deformed corners below the top surface of the block, as seen in FIGURE 6. The tips 40 of the prongs 41 of the anchor are deformed over the wires 42 of the member 35 in a manner substantially identical to the manner in which the prongs 18 are secured to the wire member 16. This embodiment provides a maximum reinforcement to the top surface 37 of the block 38 so that when the flower stems are forced into the top surface of the block they are supported in substantially the same manner as described above in connection with the embodiment of FIGURE 1. Moreover, the foam block 38 is similarly adapted to be secured by the anchor 16 in a dish, vase, or other type of container 13 without fear of becoming disconnected therefrom during rough handling or the like.

Another embodiment of the wire reinforcing members is shown in FIGURE 7, wherein the member 45 is complementary in configuration to and surrounds the upper portion of the foam block 46. Thus the member 45 includes a circular top portion 47 which is similar in size to the top surface 48 of the foam block 46, and a tubular side section 51 which is adapted to be fitted around the upper half of the side wall 53 of the block 46. The inner diameter of side section 51 is preferably equal to or slightly less than the outer diameter of the block 46 so that it must be forced thereonto and thus is held snugly in place. This embodiment of the invention wire reinforces the side walls 53 of the foam block 46 in the same manner and to the same extent as the wire mesh reinforces the top surface thereof. In addition, it adds substantial reinforcement to the entire peripheral edge 55 of a top surface 48 which are particularly susceptible to being chipped or broken away when the flower stems which have been inserted therein are subjected to rough handling.

In this embodiment the wire member 45 is held snugly on a foam block 46 and the prongs 56 of the anchor 57 extend only partially through the foam block (see FIGURE 7), and provides for holding the foam block in position when subjected to the rough handling normally encountered during the transportation of a commercial flower display. The extent to which the prongs 56 extend into the block 46 is dependent on the size of the block, and the type of flower display created thereon, and it has been found that the anchor satisfactorily holds foam blocks of conventional size in place with prongs of approximately one and one-half inches to two inches in length.

While the embodiment of FIGURES 7 and 8 again discloses the use of a cylindrical foam block 46, it should be understood that it is within the scope of the invention to vary the configuration of this block so long as the wire member 46 covers the top surface thereof as well as a portion of the sides thereof, and is snugly fitted thereon.

FIGURE 11 shows another embodiment of the wire member 45a, and in particular differs from the embodiment of FIGURE 7 in that the side section 51a of the wire member 45a covers the entire side 46a of the foam block. Such an embodiment would be used when flower stems are to be extensively inserted in the side walls of the foam block in addition to the top surface thereof. Normally, when the flower display is assembled in a dish, similar to that shown in FIGURES 1 and 7, most of the flower stems, if not all of them, are positioned in the top of the foam block. However, a small number of displays are mounted in a flat dish or the like, and many of the stems are forced into the side walls of the foam block. Consequently, the embodiment of FIGURE 11 adds substantial strength to the side walls, thus permitting a stronger and longer lasting flower display. The anchor used with the embodiment can be either of the two types described above.

Thus the invention has provided apparatus for securing the foam block to substantially any surface so that floral displays may be created in ash trays, low bowls, etc. without fear that they will not withstand the handling and transportation required by commercial displays. The surfaces of the foam material are also reinforced so that the flower stems are provided with additional support and the chipping and breaking up of the foam material is decreased with a resulting increase in the useful life of such material.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Floral display apparatus comprising, a block of water-absorbent synthetic resin foam or the like having top and side surfaces into which flower stems are inserted and held in a display position while being supplied with moisture from the water held in said block, a retainer having a flat intermediate portion adapted to abut the bottom of said block and having upturned portions on either end thereof extending perpendicularly thereto through said block, said retainer having pressure sensitive means on the lower surface of said flat intermediate portion thereof for securing the said retainer in substantially any type of container, said upturned portions having tips which extend above said top surface, a reinforcing member having a central portion which substantially covers and snugly engages said top surface of said block, said reinforcing member having side portions connected to said central portion snugly engaging said side surfaces of said block and terminating above the bottom of the block to reinforce the adjacent portions of said block so that said block can be reused and so that it resists disintegration, and said reinforcing member having openings therein sufficiently large to permit stems of flowers and the like to be inserted therethrough into said block, said tips being hooked over said reinforcing member to hold together said reinforcing member, said block and said retainer.

2. Floral display apparatus comprising, a block of water-absorbent synthetic resin foam or the like having top and side surfaces into which flower stems are inserted and held in a display position while being supplied with moisture from the water held in said block, a retainer having a flat intermediate portion adapted to abut the bottom of said block and having upturned portions on either end thereof extending perpendicularly thereto through said block, said retainer having pressure sensitive means on the lower surface of said flat intermediate portion thereof for securing the said retainer in substantially any type of container, said upturned portions having tips which extend above said top surface, a reinforcing member having a central portion which substantially covers and snugly engages said top surface of said block, said reinforcing member having side portions connected to said central portion which extend downwardly into said block to hold said reinforcing member in position for reinforcing the adjacent portions of said block so that said block can be reused and so that it resists disintegration, and said reinforcing member having openings therein sufficiently large to permit stems of flowers and the like to be inserted therethrough into said block, said tips being hooked over said reinforcing member to hold together said reinforcing member, said block and said retainer.

3. Floral display apparatus comprising, a block of water-absorbent synthetic resin foam or the like having top and side surfaces into which flower stems are inserted and held in a display position while being supplied with moisture from the water held in said block, a retainer having a flat intermediate portion adapted to abut the bottom of said block and having upturned portions on either end thereof extending perpendicularly thereto into said block to secure said retainer to said block, said retainer having pressure sensitive means on the lower surface of said flat intermediate portion thereof for securing the said retainer in substantially any type of container, a reinforcing member having a central portion which substantially covers and snugly engages said top surface of said block, said reinforcing member having side portions connected to said central portion which extend adjacent and snugly engage said side surfaces of said block and terminating above the bottom of the block to reinforce the adjacent portions of said block so that said block can be reused and so that it resists disintegration, said reinforcing member having openings therein sufficiently large to permit stems of flowers and the like to be inserted therethrough into said block.

4. Floral display apparatus comprising, a block of water-absorbent synthetic resin foam or the like having top and side surfaces into which flower stems are inserted and held in a display position while being supplied with moisture from the water held in said block, a retainer having a flat intermediate portion adapted to abut a major portion of the bottom of said block and having upturned portions on either end thereof extending perpendicularly thereto through said block, said retainer having pressure sensitive means on the lower surface of said flat intermediate portion thereof for securing the said retainer in substantially any type of container, said upturned portions having tips which extend above said top surface, a reinforcing member having a central portion which substantially covers and snugly engages a major portion of said top surface of said block, said reinforcing member having openings therein sufficiently large to permit stems of flowers and the like to be inserted therethrough into said block, said tips being hooked over said reinforcing member to hold together said reinforcing member, said block and said retainer.

5. Floral display apparatus comprising, a block of water-absorbent synthetic resin foam or the like having top and side surfaces into which flower stems are inserted and held in a display position while being supplied with moisture from the water held in said block, a retainer having a flat central portion adapted to abut a major portion of the bottom of said block and having at least one upwardly extending portion extending perpendicularly thereto and terminating in a tip above the top surface of said block, said retainer having pressure sensitive means on the lower surface of said flat central portion thereof for securing the said retainer in substantially any type of container, a reinforcing member having a portion which snugly engages a major portion of said top surface of said block, said reinforcing member having openings therein sufficiently large to permit stems of flowers and the like to be inserted therethrough into said block, and means on said tip to lockingly engage said reinforcing member to hold together said reinforcing member, said block and said retainer.

6. Floral display apparatus comprising, a block of water-absorbent synthetic resin foam or the like having top and side surfaces into which flower stems are inserted and held in a display position while being supplied with moisture from the water held in said block, a retainer having a flat central portion adapted to abut a major portion of the bottom of said block and having at least one upwardly extending portion extending perpendicularly thereto upward through said block and terminating in a tip above the top surface of said block, said retainer having pressure sensitive means on the lower surface of said flat central portion thereof for securing the said retainer in substantially any type of container, a reinforcing member having a portion which snugly engages a major portion of said top surface of said block adjacent said tip, said reinforcing member having an opening therein adapted to receive said tip, and means on said tip to lockingly engage said reinforcing member to hold together said reinforcing member, said block and said retainer.

7. Floral display apparatus comprising, a block of water-absorbent synthetic resin foam or the like having top and side surfaces into which flower stems are inserted and held in a display position while being supplied with moisture from the water held in said block, a retainer having a flat central portion adapted to abut a major portion of the bottom of said block and having upturned portions on either end thereof extending perpendicularly thereto through said block, said retainer having pressure sensitive means on the lower surface of said flat central portion thereof for securing the said retainer in substantially any type of container, said upturned portions having tips which extend above said top surface, a reinforcing member having a portion which snugly engages a major portion of said top surface of said block, said tips being lockingly engaged with said reinforcing member to hold together said reinforcing member, said block and said retainer.

References Cited
UNITED STATES PATENTS

| | | | |
|---|---|---|---|
| 1,515,787 | 11/1924 | Nishiyama et al. | 47—41 X |
| 2,712,191 | 7/1955 | Hillenbrand. | |
| 2,737,746 | 3/1956 | Orr | 47—41.12 |
| 2,765,998 | 10/1956 | Engert | 161—406 |
| 2,981,033 | 4/1961 | Cheetwood | 47—41.12 |
| 3,148,480 | 9/1964 | Gallo | 47—41.12 |

ABRAHAM G. STONE, *Primary Examiner.*

A. E. KOPECKI, *Assistant Examiner.*